(12) United States Patent
Kausemann

(10) Patent No.: US 6,839,938 B2
(45) Date of Patent: Jan. 11, 2005

(54) CASTER

(75) Inventor: Roland Kausemann, Remscheid (DE)

(73) Assignee: Rhombus Rollen GmbH & Co. (DE)

( * ) Notice: Subject to any disclaimer, the term of this patent is extended or adjusted under 35 U.S.C. 154(b) by 7 days.

(21) Appl. No.: 10/362,547

(22) PCT Filed: Aug. 1, 2001

(86) PCT No.: PCT/DE01/02946

§ 371 (c)(1),
(2), (4) Date: Feb. 21, 2003

(87) PCT Pub. No.: WO02/20285

PCT Pub. Date: Mar. 14, 2002

(65) Prior Publication Data

US 2003/0163892 A1 Sep. 4, 2003

(51) Int. Cl.⁷ .............................................. A47B 91/00
(52) U.S. Cl. ...................................... 16/35 R; 16/18 R
(58) Field of Search ............................... 16/35 R, 18 R, 16/35 D, 45; 188/1.12

(56) References Cited

U.S. PATENT DOCUMENTS

| | | | | |
|---|---|---|---|---|
| 2,885,720 A | * | 5/1959 | Seeberger | 16/44 |
| 2,942,290 A | * | 6/1960 | Segal | 16/35 R |
| 3,066,764 A | * | 12/1962 | Kramesak, Jr. et al. | 188/74 |
| 4,128,144 A | * | 12/1978 | Vassar | 188/1.12 |
| 4,494,272 A | * | 1/1985 | Morita | 16/35 R |
| 4,575,896 A | * | 3/1986 | Nakao et al. | 16/35 R |
| 5,236,066 A | * | 8/1993 | O'Neal et al. | 188/1.12 |
| 5,328,000 A | * | 7/1994 | Rutter et al. | 188/1.12 |
| 5,383,536 A | * | 1/1995 | Butter et al. | 188/1.12 |
| 5,967,535 A | * | 10/1999 | King | 280/47.38 |
| 6,223,864 B1 | * | 5/2001 | Phelps et al. | 188/19 |
| 6,382,364 B1 | * | 5/2002 | Chuang | 188/1.12 |
| 6,662,404 B1 | * | 12/2003 | Stroh et al. | 16/35 R |

FOREIGN PATENT DOCUMENTS

| | | |
|---|---|---|
| DE | 24 42 643 | 3/1976 |
| DE | 91 08 969 | 10/1991 |
| DE | 195 04 074 | 5/1996 |
| DE | 197 24 577 | 12/1998 |
| GB | 873 107 | 7/1961 |
| JP | 62043304 | 2/1987 |

OTHER PUBLICATIONS

Copy of International Search Report—2 pages.

* cited by examiner

Primary Examiner—John B. Walsh
(74) Attorney, Agent, or Firm—Kusner & Jaffe

(57) ABSTRACT

The invention relates to a caster, for example, a bed caster, appliance caster, heavy-load caster or the like, which have versatile uses in the private and commercial sectors. The inventive caster has a braking device that acts upon the lateral faces of the wheel.

11 Claims, 4 Drawing Sheets

CASTER

BACKGROUND OF THE INVENTION

The invention concerns a transport roller, such as is often used for example as a bed roller, an apparatus roller, a heavy-load roller or suchlike in the private and industrial sector. As a rule, the roller is steerable. Such a steering roller is shown in DE 197 24 577.

The known steering roller has a wheel, which is carried in a rotary manner on a fixture.

On this fixture there is also arranged a brake shoe, which by means of a bolt on the fixture can be pressed against the running face of the wheel and again released from the running face of the wheel.

Depending on the material type and/or material hardness of the running face of the wheel, different forces are required to achieve a desired braking effect. The braking power changes with increasing wear on the running face.

It is intended with the invention to make available a transport roller of the initially mentioned type with an alternative braking device, whereby the braking device should in particular be ready for operation independently of the wear on the wheel and independently of the material of the running face of the wheel.

SUMMARY OF THE INVENTION

In its most general form of embodiment, the invention relates to a transport roller with the following features:
- a wheel, which is carried in a rotary manner on a fixture,
- a one- or multi-piece bearing block, which is fixed to the fixture or is a component of the fixture,
- two sections of the bearing block run outside the wheel in its peripheral area on opposite sides of the wheel,
- each section has a pivot bearing, on which a brake lever is carried,
- the brake levers are connected via a spring at their end running above the pivot bearing in such a way that the spacing of the brake levers at their ends is variable by means of a change in the spring length between the linking points of the spring to the brake levers.

In this way, a transport roller is made available with a braking device which does not act on the running face of the wheel, but on the side faces of the wheel, in particular a wheel web, i.e. the section of the wheel which runs between the wheel hub and the wheel running face and essentially has the form of a disc with a central hole.

In this way, the braking device is independent of the type and material of the running face. The braking device is thus also independent of the degree of wear on the running face.

A further advantage consists in the fact that the braking device acts laterally on the wheel, where less dirt usually accumulates. The dirt is picked up chiefly by the running face and cannot impair the operating ability of the braking device in the case of the transport roller mentioned here.

A further important aspect of the transport roller is that the associated braking device can also be retrofitted on existing transport rollers.

This applies in particular when the spring acting upon the brake lever is itself acted upon by a bolt, which is already present for example in the form of embodiment according to DE 197 24 577 C1 and performs various functions inside a steering roller.

According to one form of embodiment, the bearing block runs essentially parallel to the wheel axis, or in other words: normal to the running direction of the wheel. With a one-part bearing block, it goes without saying that it has to overlap the wheel with a gap. The bearing block can, however, be readily designed in two parts. It is advantageous if sections of the bearing block are present respectively on both sides of the wheel, to which sections the brake levers can be coupled.

The structural shape then remains small. In principle, the pivot bearings for the brake levers can also lie beside the running face of the wheel. The levers must then, however, be sharply curved. The sections of the bearing block can, as vertical pins, also be a component of the fixture for the wheel.

In order to achieve as high a degree of variability as possible in respect of the braking power, one form of embodiment makes provision such that the brake levers are designed in such a way that their arms pointing away from the wheel, i.e. as a rule the arms running above the pivot bearing, are shorter than the arms lying opposite. Such a form of embodiment is explained in greater detail in the following description of the figures.

This also shows that the brake levers can be arranged structurally identically, but mirror-inverted inside the braking device and bent in the direction of one another at their wheel-side (lower) end.

The "brake path" can thus be reduced, in particular in the case of wheels with relatively wide running faces and only a disc-type wheel web.

The sections of the brake levers important for braking can be designed with brake linings (friction linings).

Whilst the pivot bearings for the brake levers can be simple bolts, the spring—depending on the arrangement inside the fixture—can be fitted at its ends on corresponding pins of the brake levers or be fixed in a keyed manner.

Further features of the invention and the mode of operation of the described braking device emerge from the features of the subclaims as well as the further parts of the application, in particular the following description of the figures.

BRIEF DESCRIPTION OF THE DRAWINGS

A form of embodiment of the invention is represented diagrammatically in various views and details, i.e.

DETAILED DESCRIPTION OF A PREFERRED EMBODIMENT

Figure 1:
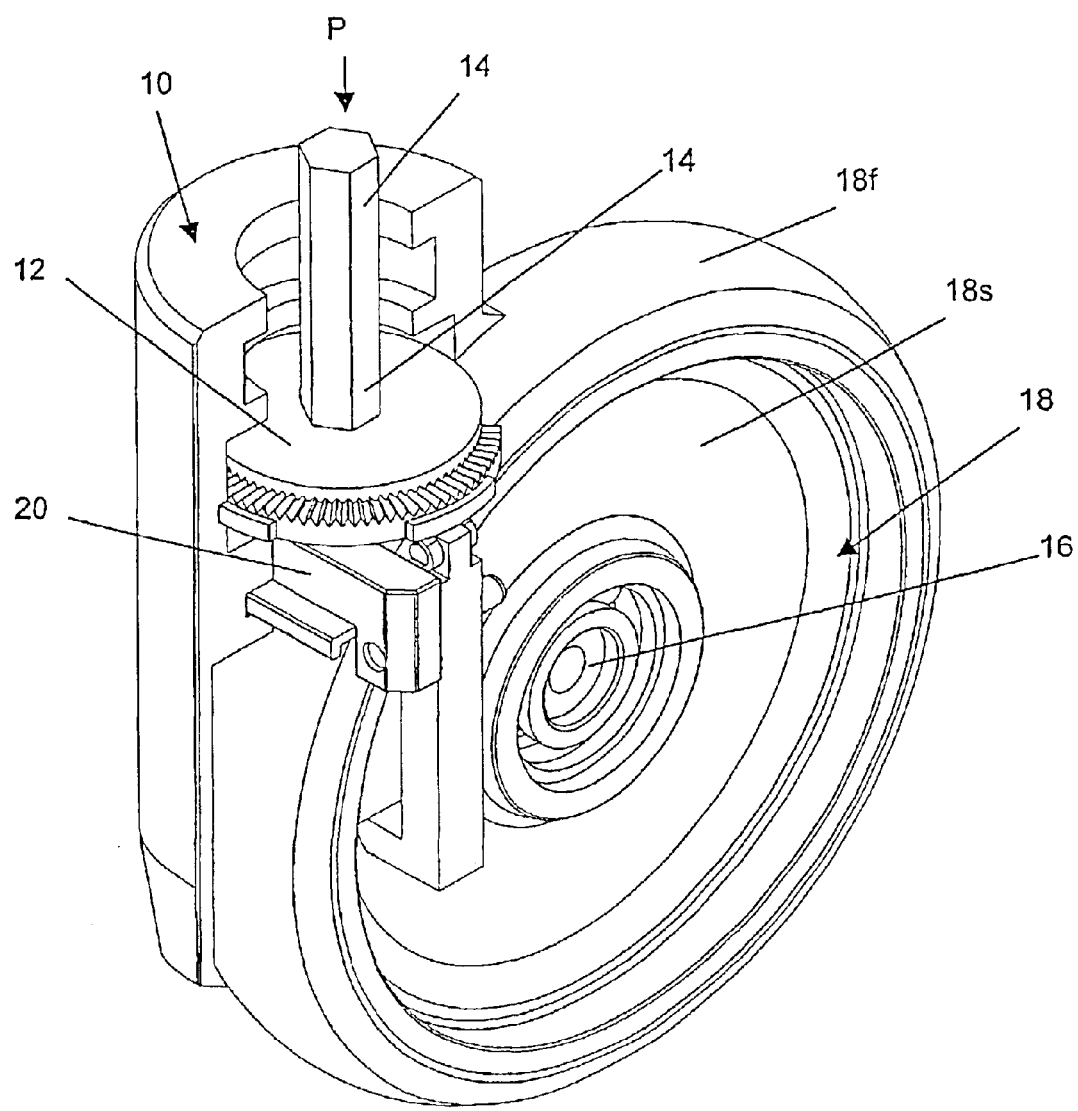
in FIG. 1: a perspective view, partially in vertical section, of a transport roller.

FIG. 1 shows a transport roller with a fixture 10, in which amongst other things a crown gear 12 is carried, through which a bolt (a toothed spindle) 14 reaches. A shaft 16 is also a component of fixture 10, on which shaft there sits a bearing which carries a wheel (running wheel) 18 in a rotary manner.

Wheel 18 has a running face 18$f$, on which a brake shoe acts according to the prior art (DE 197 24 577 C1).

Figure 2:
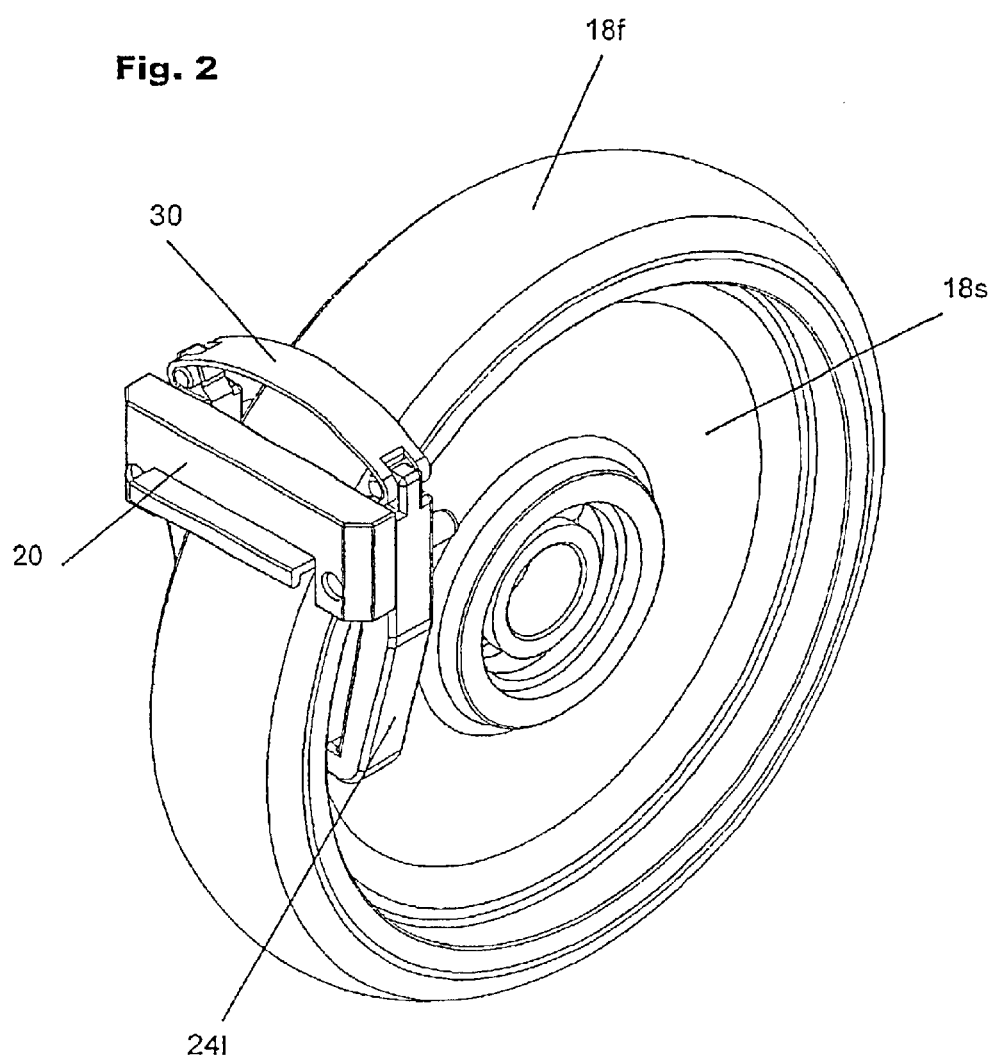
FIG. 2: a perspective partial view of the wheel solely with the associated braking device.

The braking device according to the invention, on the other hand, includes a bearing block 20, which is fixed to fixture 10 and extends over the lateral faces of wheel 18 at a distance from running face 18$f$ of wheel 18 and parallel to shaft 16, as FIGS. 1, 2 show. The two sections 20$l$, 20$r$ of bearing block 20 running outside the wheel carry bolts 22, which run essentially horizontal and parallel to a wheel web 18s of wheel 18 carrying running face 18f on its peripheral side.

Figure 3:
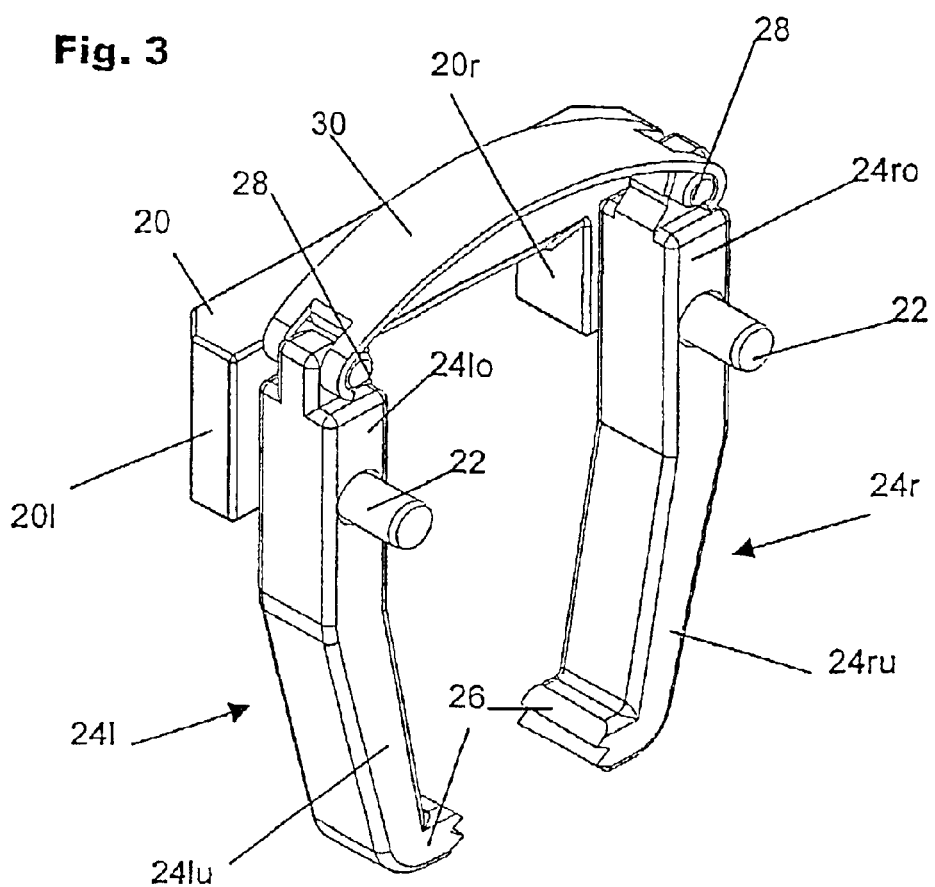
FIG. 3: a perspective separate view of the braking device.
Figure 4:
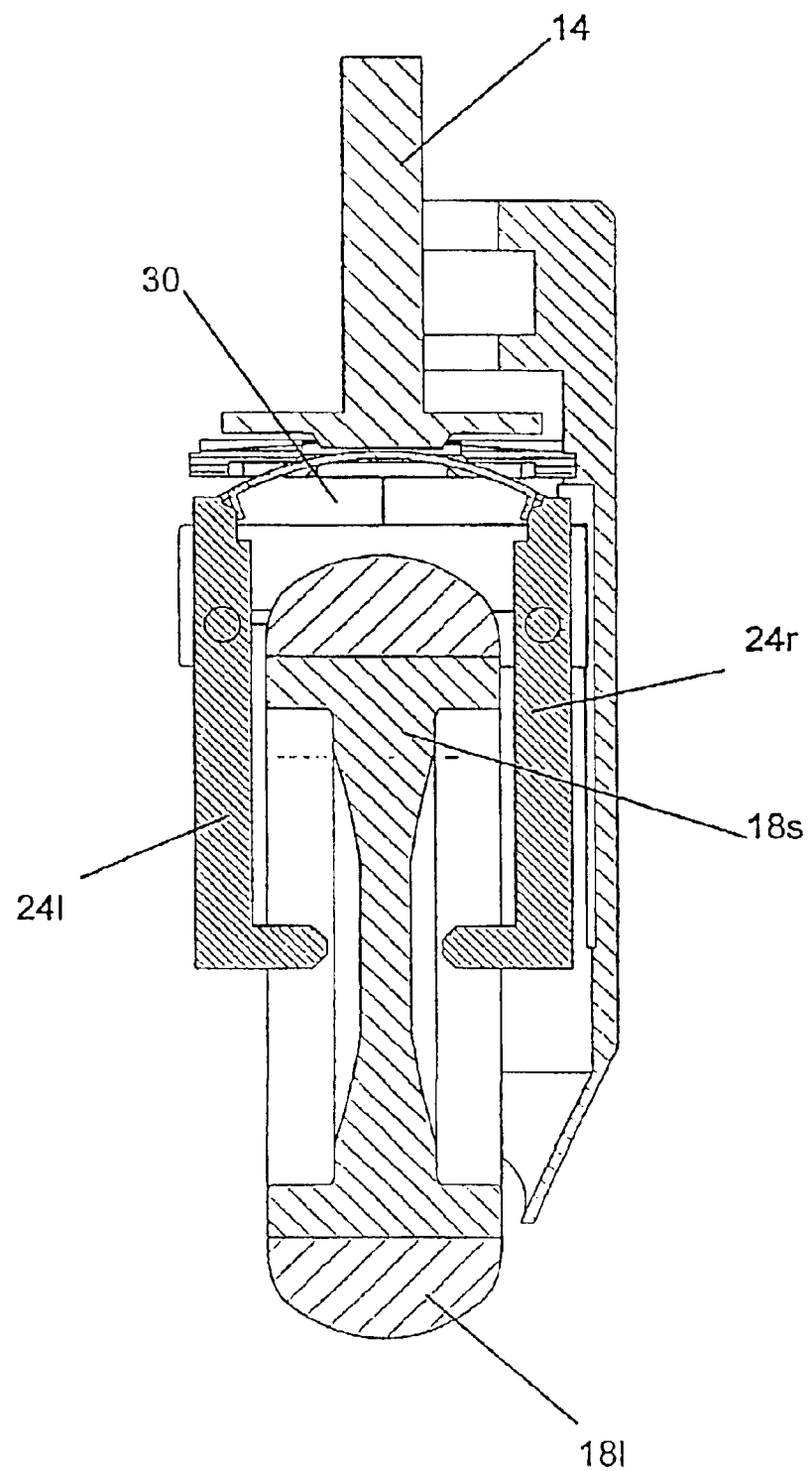
FIG. 4: a partial section through the transport roller according to FIG. 1 in the area of its brake lever.

Brake levers 24l, 24r are carried in a rotary manner on bolts 22. It can be seen from FIG. 3 in particular that the brake levers each have a shorter arm 24lo, 24ro above bolts (rotary pivots) 22 than in the lower part (arms 24lu, 24ru).

Sections 24lu, 24ru are bent inwards (towards one another) at their lower end and carry friction linings 26 there.

In the assembly position, but in the state of wheel 18 when the brakes are not applied, brake levers 24l, 24r, or more precisely their brake linings 26, lie as a small distance in front of wheel web 18s.

At the opposite end, i.e. in the area of sections 24lo, 24ro, brake levers 24l, 24r are designed narrowed and in each case accommodate a transverse pin 28, on which a bent-over end of a leaf spring 30 sits in a keyed manner. Leaf spring 30 is curved in a convex manner in relation to wheel 18 and is dimensioned such that, in the unloaded state, it holds brakes 24l, 24r at a distance that corresponds to that described previously, i.e. at which friction linings 26 stand at a distance in front of the surfaces of wheel web 18s lying opposite.

If, in the operation, spring 30 is loaded (arrow direction P in FIG. 1) by bolt (toothed spindle) 14 represented in FIG. 1, spring 30 pushes sections 24lo, 24ro of brake levers 24l, 24r apart. In parallel thereto, lower sections 24lu, 24ru are moved in the direction towards one another, whereby they are conveyed towards the surfaces of wheel web 18s and brake wheel 18.

After retraction of bolt 14, the braking position of brake levers 24l, 24r is again released, since leaf spring 30 is brought back into its unloaded initial position and sections 24lo, 24ro are again moved towards one another and sections 24lu, 24ru again moved away from one another.

What is claimed is:

1. A transport roller, comprising:
    a wheel (18), which is carried in a rotary manner on a fixture (10);
    a one- or multi-piece bearing block (20), which is fixed to the fixture (10) or is a component of the fixture;
    two sections (20l, 20r) of the bearing block (20) run outside the wheel (18) in its peripheral area on opposite sides of the wheel (18);
    each section (20l, 20r) has a pivot bearing (22), on which a brake lever (24l, 24r) is carried; and
    the brake levers (24l, 24r) are connected by a spring (30) at their end (24lo, 24ro) running above the pivot bearing (22) in such a way that a spacing of the brake levers (24l, 24r) at their ends (24lo, 24ro; 24lu, 24ru) is variable by means of a change in the spring length between the linking points of the spring (30) to the brake levers (24l, 24r).

2. The transport roller according to claim 1, wherein the bearing block (20) whereof runs essentially parallel to the wheel axis and overlaps the wheel (18) with a gap.

3. The transport roller according to claim 1, wherein first arms (24lo, 24ro) of the brake levers (24l, 24r) running above the pivot bearing (22) are shorter than second arms (24ru, 24lu) of the brake levers (24l, 24r) running below the pivot bearing (22).

4. The transport roller according to claim 1, the brake levers (24l, 24r) whereof are coupled on the bearing block (20) in a structurally identical, but mirror-inverted manner.

5. The transport roller according to claim 1, the brake levers (24l, 24r) whereof are bent in the direction of one another at their end (24lu, 24ru) running below the pivot bearing (22).

6. The transport roller according to claim 1, with which the ends (24lu, 24ru) of the brake levers (24l, 24r) running below the pivot bearings are designed with brake linings (26).

7. The transport roller according to claim 1, the pivot bearings (22) whereof consist of bolts, whose axes run parallel to the wheel plane.

8. The transport roller according to claim 1, with which the spring (30) is designed as a leaf spring.

9. The transport roller according to claim 1, with which the spring (30) is bent over as it ends and fitted on corresponding bearing pins (28).

10. The transport roller according to claim 1, with which the spring (30) can be acted upon by a bolt (14).

11. The transport roller according to claim 10, with which the bolt (14) is a component of the fixture (10) carrying the wheel (18).

\* \* \* \* \*